United States Patent Office 3,810,927
Patented May 14, 1974

3,810,927
3-OXYGENATED - 30 - METHYLOLEAN-12-EN-30-
ONES AND 11-OXO DERIVATIVES THEREOF
John S. Baran, Morton Grove, and Chi-Dean Liang, Glenview, Ill., assignors to G. D. Searle & Co., Chicago, Ill.
No Drawing. Filed Feb. 10, 1972, Ser. No. 225,275
Int. Cl. A61k 27/00; C07c 49/54, 49/56
U.S. Cl. 260—410      10 Claims

ABSTRACT OF THE DISCLOSURE

3β-acetoxy-18β-olean-12-en-30-oic acid and its 11-oxo derivatives are converted to the acid chloride and methylated to afford the 3β-acetoxy-30-methyl-18β-olean-12-en-30-one and 3β-acetoxy-30-methyl-18β-olean-12-ene-11,30-dione compounds, respectively. Those intermediates then are treated with base to produce the 3β-hydroxy derivatives, which are oxidized to the 3-oxo derivatives. The 3β-hydroxy and 3-oxo compounds exhibit valuable pharmacological, e.g. anti-inflammatory and anti-hypertensive, activity.

The present invention is concerned generally with members of the oleanane family. More particularly, it is concerned with compounds of the structural formula

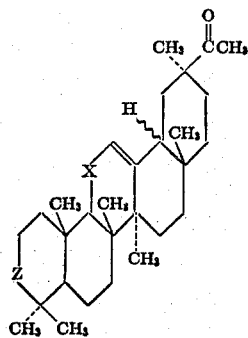

wherein X is carbonyl or a methylene radical, Z is a carbonyl, (lower alkanol)oxymethylene, stearoyloxy-methylene or hydroxymethylene radical and the wavy line represents the alternative 18α or 18β configuration. The lower alkanoyl radicals represented in the above formula contain up to 7 carbon atoms and are illustrated by acetyl and propionyl.

A preferred method of manufacturing the 11-oxo compounds and 11-desoxy compounds of this invention begins with the formation of the acid chlorides by contacting the appropriate 3-(lower alkanoyl)oxy acids with thionyl chloride. In that manner, 3β-acetoxy-11-oxo-18β-olean-12-en-30-oic acid and 3β-acetoxy-18β-olean-12-en-30-oic acid are converted to the corresponding 3β-acetoxy-11-oxo-18β-olean-12-en-30-oyl chloride and 3β-acetoxy-18β-olean-12-en-30-oyl chloride, respectively. Treatment of the acid chlorides with dimethyl cadmium affords the methylated derivatives, 3β-acetoxy-30-methyl-18β-olean-12-ene-11,30-dione and 3β-acetoxy-30-methyl-18β-olean-12-en-30-one. Hydrolysis of the 3-(lower alkanoyl)oxy compounds, accomplished by refluxing those compounds in base, such as an alcoholic sodium hydroxide solution, affords the 3-hydroxy derivatives, 3β-hydroxy-30-methyl-18β-olean-12-ene-11,30-dione and 3β-hydroxy-30-methyl-18β-olean-12-en-30-one, and oxidation of the latter compounds with aqueous chromic acid produces the instant 3-oxo derivatives, 30-methyl - 18β - olean-12-ene-3,11,30-trione and 30-methyl-18β-olean-12-ene-3,30-dione.

For the purposes of this invention, it is understood that the 18α-derivatives are equivalent to the corresponding 18β-derivatives and may be reacted in the same manner as the 18β-compounds to produce the instant 18α-products.

The compounds of this invention are useful as pharmacological agents in view of their biological, e.g. anti-inflammatory and anti-hypertensive, activity. For example, 3β - hydroxy-30-methyl-18β-olean-12-ene-11,30-dione and 3β-hydroxy-30-methyl - 18β - olean-12-en-30-one are active intragastrically in the following assay which is designed to determine anti-inflammatory activity.

Intact, male Sprague-Dawley rats, weighing 170–200 g., are injected intradermally on the base of the tail with 0.6 mg. of dry, heat-killed *Mycobacterium butyricum* suspended in 0.05 ml. of paraffin oil. The animals are randomized into groups of 12 and daily treatment with compounds is begun. Compounds are administered subcutaneously or intragastrically for 19 consecutive days. The rats are sacrificed on the 20th day and the degree of swelling in the hind paws is determined by a volume displacement apparatus or by ankle circumference measurement. Each treated group is compared statistically with the control group and the compound is rated active if it causes a significant reduction in swelling ($P<0.05$) as compared to the control (Wilcoxon Rank Sum).

The anti-hyptertensive activity of the instant 30-methyl-18β-olean-12-ene-3,30-dione is demonstrated by the following assay:

The test procedure makes use of the fact that chronic administration of desoxycorticosterone acetate induces a self sustaining hypertension that is similar in many respects to essential hypertension in man (D. N. Green et al., American Journal of Physiology, 170 94 1952). In this test, 50-g. male Charles River rats are implanted with a 20 mg. wax pellet containing 10 mg. of desoxycorticosterone acetate. After 5 weeks, their systolic blood pressures are measured electrosphygmorgraphically on the tail artery. The following day, groups of 5 rats are then given 60 mpk. of test compound intragastrically. Four hours later, the blood pressures are again measured and the decrease in pressure from control day is calculated and compared with concurrent controls. The compound is considered active if it produces a significant decrease in systolic blood pressure.

The anti-hypertensive activity of 30-methyl-18β-olean-12-ene-3,11,30-trione is determined by an assay described in U.S. Pat. 3,455,921.

The invention will appear more fully from the examples which follow. They are not to be construed as limiting the invention either in spirit or in scope as many modifications in materials and methods will be apparent to those skilled in the art. Temperatures are given in degrees centigrade (° C.) and quantities of material in parts by weight unless parts by volume is specified.

EXAMPLE 1

To a suspension containing 3 parts of 3β-acetoxy-11-oxo-18β-olean-12-en-30-oic acid, 214 parts of anhydrous ethyl ether and 14.7 parts of pyridine is added, dropwise at room temperature, 21.9 parts of thionyl chloride. After stirring the reaction mixture for 4 hours, 100 parts by volume of an ethereal hydrochloric acid solution is added. The resulting mixture is filtered and the filtrate is evaporated to dryness. Then 46.2 parts of n-hexane is added to the solid and the solution is brought to reflux temperature. After cooling, the solid is recovered by filtration and dried to yield 3β-acetoxy-11-oxo-18β-olean-12-en-30-oyl chloride.

EXAMPLE 2

When an equivalent quantity of 3β-acetoxy-18β-olean-12-en-30-oic acid is substituted in the procedure of Example 1, there is produced 3β-acetoxy-18β-olean-12-en-30-oyl chloride.

EXAMPLE 3

0.25 part of magnesium turnings is covered by 36 parts of ether and 1.4 parts of methyl iodide in 7 parts of ether is added to that mixture over a 1 hour period. Then the mixture is cooled in an ice bath and 1.0 part of cadmium chloride, which was dried at 110° for 1 hour, is added over a 5 minute period. The mixture is removed from the ice bath, stirred at room temperature for 5 minutes and refluxed for 45 minutes. Then the ether is removed by distillation and 8.8 parts of anhydrous benzene is added. After cooling the mixture to room temperature, 3.0 parts of 3β-acetoxy-11-oxo-18β-olean-12-en-30-oyl chloride is added and the mixture is refluxed for 2 hours. Cooling of the reaction mixture followed by the addition of ice water and 20% sulfuric acid affords two phases. The organic phase is separated, successively washed with water, aqueous sodium bicarbonate solution and water until neutral and dried over anhydrous magnesium sulfate. Then the benzene is evaporated and the material remaining is recrystallized from methanol to yield 3β-acetoxy-30-methyl-18β-olean-12-ene-11,30-dione, melting at about 278–279°. That compound is represented by the following structural formula

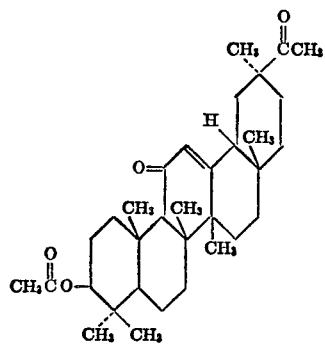

EXAMPLE 4

Substitution of an equivalent quantity of 3β-acetoxy-18β-olean-12-en-30-oyl chloride in the procedure of Example 3 yields 3β-acetoxy-30-methyl-18β-olean-12-en-30-one. That compound melts at about 232–233° and is represented by the following structural formula

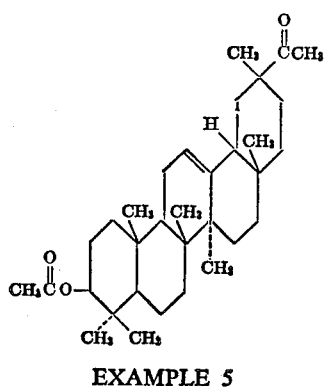

EXAMPLE 5

A solution of 0.350 part of 3β-acetoxy-30-methyl-18β-olean-12-en-30-one, 16.3 parts of denatured ethanol and 15 parts by volume of a 0.2 N potassium hydroxide in ethanol solution is refluxed for 1 hour. Then the ethanol is evaporated and the organic material is extracted with chloroform, washed with water until neutral, dried and recrystallized from ethanol to yield 3β-hydroxy-30-methyl-18β-olean-12-en-30-one. That compound melts at about 235–237° and is represented by the following structural formula

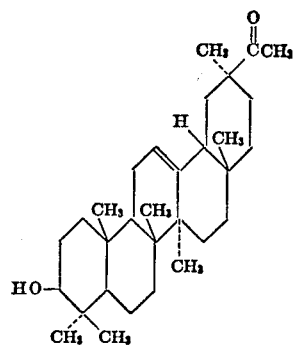

EXAMPLE 6

A mixture containing 0.400 part of 3β-acetoxy-30-methyl-18β-olean-12-ene-11,30-dione, 23.8 parts of methanol and 10 parts by volume of a 0.2 N potassium hydroxide in methanol solution is refluxed for 25 hours. The solvent is evaporated and the organic material remaining is extracted with chloroform, washed with water and dried. After recrystallization from methanol, pure 3β-hydroxy-30-methyl-18β-olean-12-ene-11,30-dione, melting at about 249–251°, is obtained. The product is represented by the following structural formula

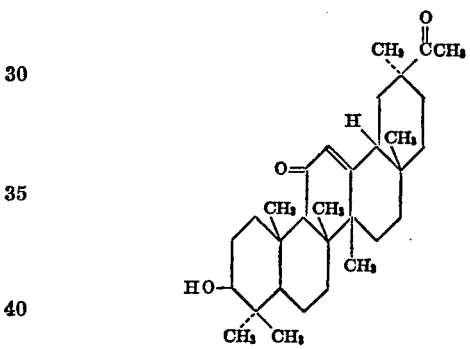

EXAMPLE 7

To a stirred solution, cooled to 0°, of 0.500 part of 3β-hydroxy-30-methyl-18β-olean-12-en-30-one dissolved in 31.5 parts of acetone is added, portionwise, 0.6 part by volume of 4 M chromic acid and 0.20 part of magnesium sulfate. The addition schedule is such that the temperature remains at less than 4°. After the addition is complete, the mixture is stirred for an additional 10 minutes. Then a solution containing 3.14 parts of isopropanol, 0.5 part of potassium carbonate and 3 parts of water is added in one portion. The mixture is filtered and the filtrate is evaporated to dryness. The material remaining is recrystallized from methanol to yield 30-methyl-18β-olean-12-ene-3,30-dione. That compound melts at about 260–264° and is represented structurally by the following formula

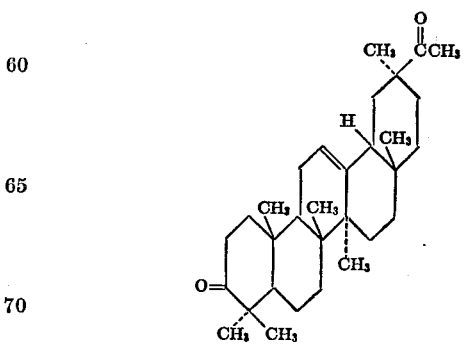

EXAMPLE 8

By substituting an equivalent quantity of 3-hydroxy-30-methyl-18β-olean-12-ene-11,30-dione in the procedure of Example 7, there is produced 30-methyl-18β-olean-12-ene-3,11,30-trione. Recrystallization from ethyl acetate affords pure material melting at about 296–298°. That compound is represented by the following structural formula

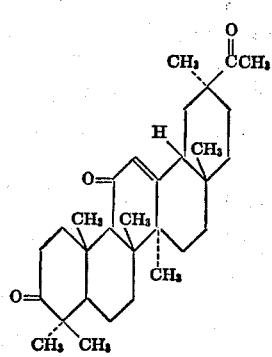

EXAMPLE 9

To a solution of 0.250 part of 3β-hydroxy-30-methyl-18β-olean-12-en-30-one in 3 parts of pyridine is added 0.150 part of stearoyl chloride and the mixture is stirred at room temperature for 2 hours. Then an additional 0.200 part of stearoyl chloride is added and, after stirring the solution for an additional ½ hour, ether and ice water are added. The organic layer is washed with water until neutral and then dried over anhydrous sodium sulfate. The solvent is evaporated and the oily material which remains is extracted with methanol. The volume of the methanol extract is reduced to ½ of its original volume by heating and the solution is cooled to room temperature. The remaining solvent is evaporated under reduced pressure to afford crude product which, when chromatographed on silica gel with ethyl acetate-benzene as eluant and recrystallized from methanol, yields pure 3β-stearoyloxy-30-methyl-18β-olean-12-en-30-one, melting at about 119–120°.

EXAMPLE 10

When an equivalent quantity of 3β-hydroxy-30-methyl-18β-olean-12-ene-11,30-dione is substituted in the procedure of Example 9, there is obtained 3β-stearoyloxy-30-methyl-18β-olean-12-ene-11,30-dione.

EXAMPLE 11

By substituting an equivalent quantity of 3β-propionyloxy-11-oxo-18β-olean-12-en-30-oic acid in the procedure of Example 1 and otherwise successively following the procedures outlined in Examples 1, 3 and 6, there is produced, respectively, 3β-propionyloxy-11-oxo-18β-olean-12-en-30-oyl chloride, 3β-propionyloxy-30-methyl-18β-olean-12-ene-11,30-dione and 3β-hydroxy-30-methyl-18β-olean-12-ene-11,30-dione. The latter compound is identical to the product of Example 6.

EXAMPLE 12

By substituting an equivalent quantity of 3β-propionyloxy-18β-olean-12-en-30-oic acid in the procedure of Example 1 and otherwise successively following the procedures of Examples 1, 3 and 5, there is obtained, respectively, 3β-propionyloxy-18β-olean-12-en-30-oyl chloride, 3β - propionyloxy-30-methyl-18β-olean-12-en-30-one and 3β-hydroxy-30-methyl-18β-olean-12-en-30-one. The latter compound is identical to the product of Example 5.

What is claimed is:
1. A compound of the formula

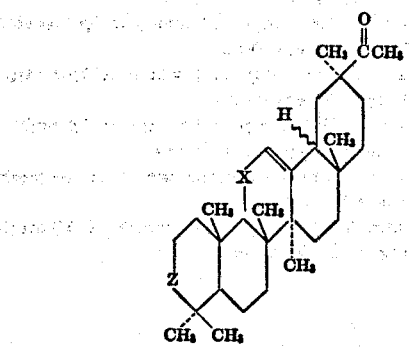

wherein X is selected from the group consisting of carbonyl and methylene radicals, Z is selected from the group consisting of carbonyl, β-(lower alkanoyl)oxymethylene, β-stearoyloxymethylene and β-hydroxymethylene radicals and the wavy line represents the alternative 18α or 18β configuration.

2. As in claim 1, a compound of the formula

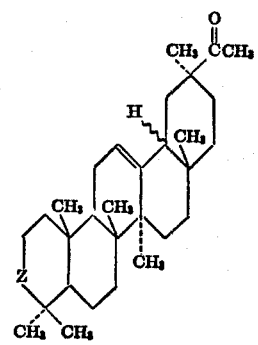

wherein Z is selected from the group consisting of carbonyl, β-(lower alkanoyl)oxymethylene, β-stearoyloxymethylene and β-hydroxymethylene radicals and the wavy line represents the alternative 18α or 18β configuration.

3. As in claim 1, a compound of the formula

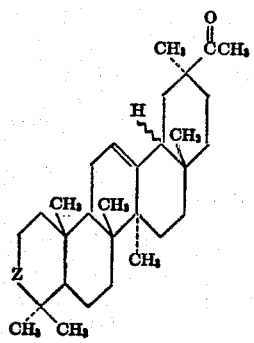

wherein Z is selected from the group consisting of carbonyl, β-(lower alkanoyl)oxymethylene, β-stearoyloxymethylene and β-hydroxymethylene radicals and the wavy line represents the alternative 18α or 18β configuration.

4. As in claim 1, the compound which is 3β-acetoxy-30-methyl-18β-olean-12-ene-11,30-dione.

5. As in claim 1, the compound which is 3β acetoxy-30-methyl-18β-olean-12-en-30-one.

6. As in claim 1, the compound which is 3β-hydroxy-30-methyl-18β-olean-12-en-30-one.

7. As in claim 1, the compound which is 3β-hydroxy-30-methyl-18β-olean-12-ene-11,30-dione.

8. As in claim 1, the compound which is 30-methyl-18β-olean-12-ene-3,30-dione.

9. As in claim 1, the compound which is 30-methyl-18β-olean-12-ene-3,11,30-trione.

10. As in claim 1, the compound which is 3β-stearoyloxy-30-methyl-18β-olean-12-en-30-one.

References Cited
UNITED STATES PATENTS 3,084,185   4/1963   Gottfried et al. _____ 260—488

OTHER REFERENCES

Brieskorn et al.: Archiv der Pharmazie 303 (11), 905–12 (November 1970).

ELBERT L. ROBERTS, Primary Examiner

D. G. RIVERS, Assistant Examiner

U.S. Cl. X.R.

260—488 B, 489, 586 H; 424—312, 311, 331

UNITED STATES PATENT OFFICE
CERTIFICATE OF CORRECTION

Patent No. 3,810,927      Dated May 14, 1974

Inventor(s) John S. Baran and Chi-Dean Liang

It is certified that error appears in the above-identified patent and that said Letters Patent are hereby corrected as shown below:

Column 1, line 46, "(lower alkanol)" should be -- (lower alkanoyl) --.

Column 6, second formula,

" 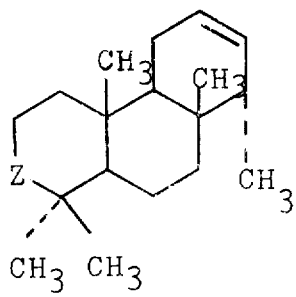 " should be -- 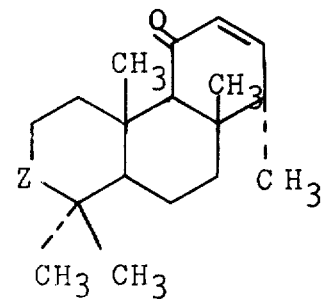 --.

Column 7, line 7, "3β acetoxy" should be -- 3β-acetoxy --.

Signed and sealed this 8th day of October 1974.

(SEAL)
Attest:

McCOY M. GIBSON JR.                C. MARSHALL DANN
Attesting Officer                  Commissioner of Patents